United States Patent
Kim et al.

(10) Patent No.: US 10,151,279 B2
(45) Date of Patent: Dec. 11, 2018

(54) APPARATUS FOR COOLING VEHICLE ENGINE

(71) Applicant: HYUNDAI MOTOR COMPANY, Seoul (KR)

(72) Inventors: Han Sang Kim, Ansan-si (KR); Byung Hyun Lee, Bucheon-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 11 days.

(21) Appl. No.: 15/231,245

(22) Filed: Aug. 8, 2016

(65) Prior Publication Data
US 2017/0138320 A1    May 18, 2017

(30) Foreign Application Priority Data
Nov. 13, 2015    (KR) .................. 10-2015-0159934

(51) Int. Cl.
| | |
|---|---|
| F02M 26/28 | (2016.01) |
| F02M 26/24 | (2016.01) |
| F02M 26/30 | (2016.01) |
| F01P 3/02 | (2006.01) |

(52) U.S. Cl.
CPC ............. *F02M 26/28* (2016.02); *F01P 3/02* (2013.01); *F02M 26/24* (2016.02); *F02M 26/30* (2016.02); *F01P 2003/021* (2013.01); *Y02T 10/16* (2013.01)

(58) Field of Classification Search
CPC ........ F02M 26/28; F02M 26/24; F02M 26/30; F01P 3/02; F01P 2003/021
USPC .................................................. 123/568.12
See application file for complete search history.

(56) References Cited

U.S. PATENT DOCUMENTS

| | | | | |
|---|---|---|---|---|
| 3,217,696 A * | 11/1965 | Kiekhaefer | .......... | B63H 20/245 123/198 DA |
| 3,715,009 A * | 2/1973 | Smith | ....................... | B64F 1/26 181/218 |
| 3,937,196 A * | 2/1976 | Cook | ..................... | F02M 26/28 123/568.12 |
| 4,258,687 A * | 3/1981 | Mauch | ...................... | F01P 3/18 123/184.33 |
| 6,244,256 B1 * | 6/2001 | Wall | ..................... | F02B 29/0425 123/568.12 |
| 6,311,678 B1 * | 11/2001 | Lepoutre | .................. | F28D 7/16 123/184.61 |
| 6,360,702 B1 | 3/2002 | Osada | | |

(Continued)

FOREIGN PATENT DOCUMENTS

| | | |
|---|---|---|
| JP | 2001-132556 A | 5/2001 |
| JP | 2010-190064 A | 9/2010 |

(Continued)

*Primary Examiner* — David Hamaoui
*Assistant Examiner* — Susan Scharpf
(74) *Attorney, Agent, or Firm* — McDermott Will & Emery LLP

(57) ABSTRACT

An apparatus for cooling a vehicle engine includes a combustion chamber having a reciprocating piston, a water jacket for flowing cooling water to cool the combustion chamber, and a cylinder block forming a structure of the engine, wherein the cylinder block is equipped with a cylinder block body that includes the combustion chamber, and wherein the cylinder block includes a plurality of EGR coolers that exchange heat with the cooling water supplied to the combustion chamber.

9 Claims, 4 Drawing Sheets

(56) References Cited

U.S. PATENT DOCUMENTS

| | | | | |
|---|---|---|---|---|
| 7,380,544 B2* | 6/2008 | Raduenz | F28D 9/0056 |
| | | | 123/568.12 |
| 7,584,749 B2* | 9/2009 | Kardos | F02B 29/0437 |
| | | | 123/41.31 |
| 8,132,407 B2* | 3/2012 | Li | F02M 26/25 |
| | | | 123/568.11 |
| 8,905,008 B2* | 12/2014 | Leroux | F02B 29/0418 |
| | | | 123/188.14 |
| 9,038,609 B2* | 5/2015 | Meshenky | F02B 29/0462 |
| | | | 123/184.21 |
| 9,038,610 B2* | 5/2015 | Meshenky | F02M 35/112 |
| | | | 123/184.21 |
| 9,103,268 B2* | 8/2015 | Mueller | F02B 29/0418 |
| 9,238,988 B2* | 1/2016 | Spooner | F01N 13/00 |
| 9,494,369 B2* | 11/2016 | Denoual | F28D 9/0006 |
| 9,897,046 B2* | 2/2018 | Engineer | F02M 26/20 |
| 2005/0188965 A1* | 9/2005 | Usui | F28D 15/0266 |
| | | | 123/568.12 |
| 2007/0017489 A1* | 1/2007 | Kuroki | F02M 26/25 |
| | | | 123/568.12 |
| 2008/0110433 A1 | 5/2008 | Lee | |
| 2008/0251242 A1* | 10/2008 | Irmler | F28D 9/0043 |
| | | | 165/164 |
| 2010/0146974 A1* | 6/2010 | Ast | F01K 23/065 |
| | | | 60/671 |
| 2012/0247145 A1* | 10/2012 | Denoual | F28D 9/0006 |
| | | | 62/498 |
| 2014/0209073 A1 | 7/2014 | Johnson | |

FOREIGN PATENT DOCUMENTS

| | | |
|---|---|---|
| JP | 2013-036338 A | 2/2013 |
| JP | 2015-010495 A | 1/2015 |

* cited by examiner

APPARATUS FOR COOLING VEHICLE ENGINE

CROSS-REFERENCE TO RELATED APPLICATION

This application claims the benefit of priority to Korean Patent Application No. 10-2015-0159934, filed on Nov. 13, 2015 with the Korean Intellectual Property Office, the disclosure of which is incorporated herein in its entirety by reference.

TECHNICAL FIELD

The present disclosure relates to an apparatus for cooling a vehicle engine, and more particularly, to an apparatus for cooling a vehicle engine equipped with a cylinder block that cools a recirculation exhaust gas which is burned in the engine and exhausted.

BACKGROUND

A discharge gas of a vehicle may include harmful substances such as carbon monoxide (CO), nitrogen oxides (NOx), hydrocarbon (HC), and the like. Among the above three substances which are generated in a combustion process, the nitrogen oxides exist in an inverse relation with respect to the carbon monoxide and the hydrocarbon.

That is, when the carbon monoxide and hydrocarbon are most significantly reduced in a practical output range, the nitrogen oxides are most significantly increased. The nitrogen oxides are more increased as complete combustion of fuel is accomplished, that is, as the temperature of the engine is increased.

Accordingly, various technologies have been developed to reduce the discharge gas, as an allowable amount of portions of the discharge gas, such as the nitrogen oxides, are regulated by a related Act. One of the technologies is an exhaust gas recirculation apparatus (hereinafter 'EGR').

The EGR supplies part of combusted gas (EGR gas) with a mixed gas inhaled to a combustion chamber while maintaining a mixing ratio to a theoretical air-fuel ratio in order to reduce the amount of the generation of nitrogen oxides without significantly increasing other harmful substances. The EGR is a device that increases the heat capacity of the combustion gas to lower the temperature of a flame.

In more detail, the EGR is an apparatus for recycling the exhaust gas among the discharge gas to an intake system and lowering the combustion temperature in the cylinder to suppress the generation of nitrogen oxides. This EGR is a means for reducing nitrogen oxides (NOx) in the exhaust gas, and refers to an apparatus for turning a portion of the exhaust gas back to the intake system and lowering the highest temperature when the mixed gas is burned to reduce the generation of nitrogen oxides (NOx).

An EGR cooler among the configuration of the EGR is a kind of a heat exchanger which cools the high temperature exhaust gas using cooling water of the engine as a refrigerant. The EGR cooler may be mounted in, or on, the outside of the cylinder block or may be mounted in, or on, the outside of the engine in order to cool the EGR cooler.

SUMMARY

The present disclosure has been made in view of the above problems, and provides an apparatus for cooling a vehicle engine capable of reducing a vibration of a vehicle or a vibration generated in the engine.

The present disclosure further provides an apparatus for cooling a vehicle engine capable of reducing assembly works according to a joint (brazing) between parts, while reducing a space (layout) for mounting the EGR cooler.

The present disclosure further provides an apparatus for cooling a vehicle engine capable of improving a cooling efficiency of a cylinder head and an EGR cooler.

In accordance with aspects of the present disclosure, an apparatus for cooling a vehicle engine includes: An apparatus for cooling a vehicle engine, the apparatus including a combustion chamber having a reciprocating piston; a water jacket for flowing cooling water to cool the combustion chamber; and a cylinder block forming a structure of the engine, wherein the cylinder block is equipped with a cylinder block body that includes the combustion chamber, and wherein the cylinder block includes a plurality of EGR coolers that exchange heat with cooling water supplied to the cylinder block body.

The cylinder block body may comprise an EGR cooler insertion part which is formed in a longitudinal direction of the cylinder block body, and to which the cooling water is introduced, wherein the plurality of EGR coolers is inserted into the EGR cooler insertion part.

The EGR cooler insertion part may be formed with a plurality of chambers into which the plurality of EGR coolers is inserted.

The plurality of EGR coolers may comprises a first EGR cooler which is inserted into one of the plurality of chambers; and a second EGR cooler which is inserted into one of the other of the plurality of chambers, wherein the first EGR cooler and the second EGR cooler have a different amount of inhaled exhaust gas, wherein the first EGR cooler may comprise: a first EGR cover for closing the EGR cooler insertion part; and a first gas tube installed in the first EGR cover, and provided with an intake port to which an exhaust gas combusted in the engine is introduced and an exhaust-gas port which discharges the exhaust gas introduced through the intake port.

The second EGR cooler may comprise a second EGR cover for closing the EGR cooler insertion part; and a second gas tube installed in the second EGR cover and provided with an intake port to which an exhaust gas combusted in the engine is introduced and an exhaust-gas port which discharges the exhaust gas introduced through the intake port.

A plurality of first gas tubes may be stacked in longitudinal and lateral directions, and a plurality of second gas tubes may be provided in a number less than that of the first gas tubes and stacked in the longitudinal and lateral directions so that a heat exchange amount of the cooling water with the first gas tubes is implemented to be different than that of the second gas tubes.

An intake port of one of the first gas tubes may be disposed close to an intake port of the second gas tube.

The first gas tubes and the second gas tubes may be formed into an elliptical shape.

The cylinder block body may be provided with an inlet to which the cooling water is introduced from the outside of the cylinder block body and a feed inlet which may induce the cooling water into the water jacket from the inlet, and wherein the cooling water flows to the feed inlet and the EGR cooler insertion part.

The EGR cooler having a relatively large amount of heat exchange with the cooling water among the plurality of EGR coolers may be disposed relatively close to the inlet.

The plurality of chambers may comprise a first chamber to which the first EGR cooler is inserted; and a second chamber to which the second EGR cooler is inserted, and wherein the first chamber communicates with the second chamber so that the cooling water which exchanged heat with the first EGR cooler is induced to the second chamber from the first chamber.

The cylinder block body may include an inlet to which the cooling water is introduced from the outside of the cylinder block body and a feed inlet which induces the cooling water into the water jacket from the inlet, wherein the first chamber distributes the cooling water introduced through the inlet to the feed inlet and the first EGR cooler.

A method for cooling a vehicle engine, may include introducing cooling water from the outside of a cylinder block of a vehicle; supplying the cooling water introduced to the cylinder block to a cylinder block body forming a shape of the cylinder block and an EGR cooler insertion part formed in the cylinder block body; supplying the cooling water supplied to a cylinder block to a water jacket formed around a combustion chamber to exchange heat with a piston, and supplying the cooling water to exchange heat with a plurality of EGR coolers inserted into the EGR cooler insertion part; and discharging an exhaust gas after exchanging heat between the cooling water supplied to the EGR cooler insertion part and the plurality of EGR coolers inserted into the EGR cooler insertion part.

The plurality of EGR coolers may be respectively provided with a plurality of gas pipes which exchanges heat with the cooling water, and at least two of the plurality of gas pipes are provided differently so that an amount of heat exchange with the cooling water varies accordingly.

In the plurality of EGR coolers, an intake port receiving the exhaust gas combusted in an engine may inhale the exhaust gas and exchange heat through the gas pipe, and the exhaust gas may be discharged through an exhaust-gas port.

BRIEF DESCRIPTION OF THE DRAWINGS

The objects, features and advantages of the present disclosure will be more apparent from the following detailed description in conjunction with the accompanying drawings, in which.

DETAILED DESCRIPTION

Exemplary embodiments of the present disclosure will be described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Figure 1:
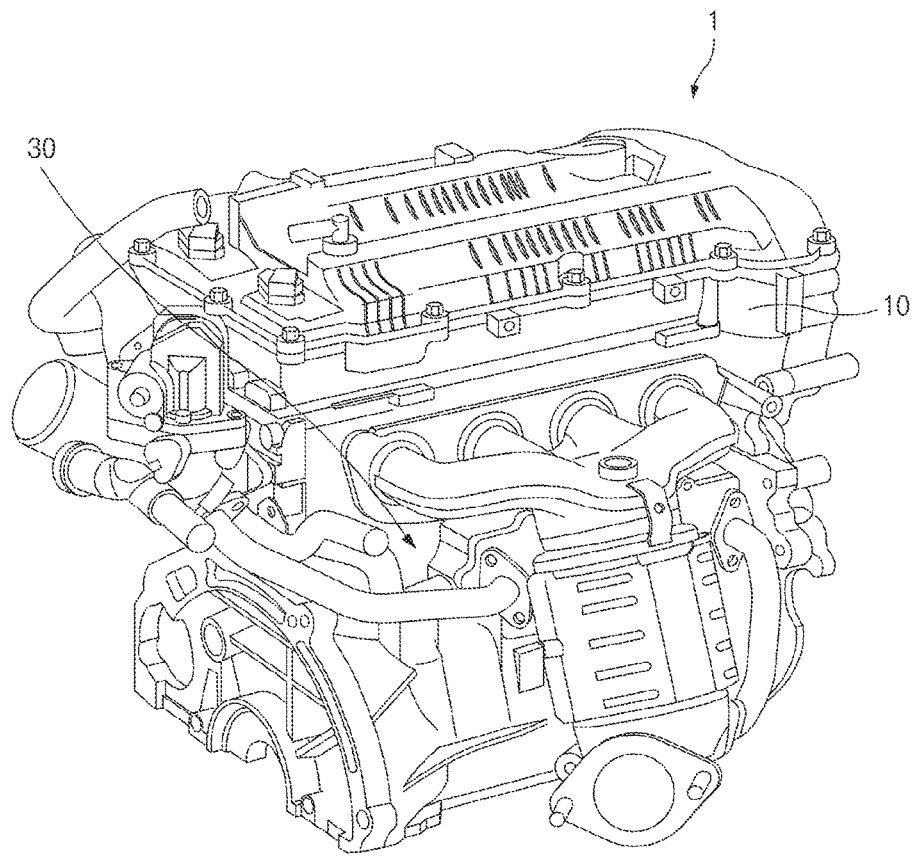
FIG. 1 is a perspective view illustrating a vehicle engine according to an embodiment of the present disclosure.
Figure 2:
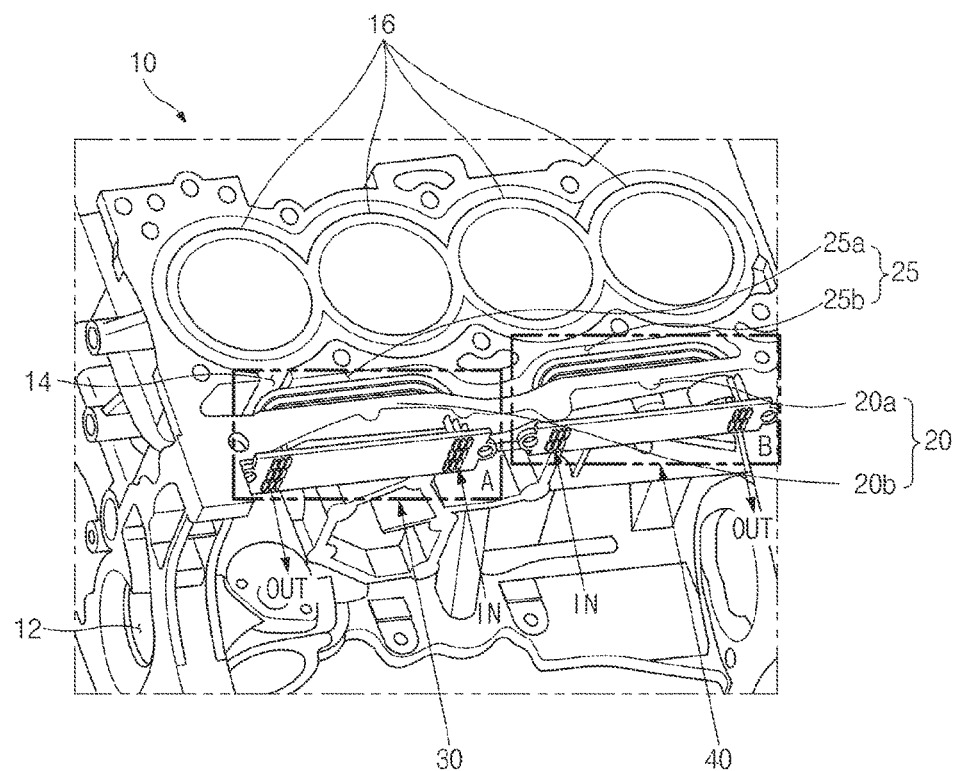
FIG. 2 is a perspective view illustrating a cylinder block of an embodiment of the present disclosure.
Figure 3:
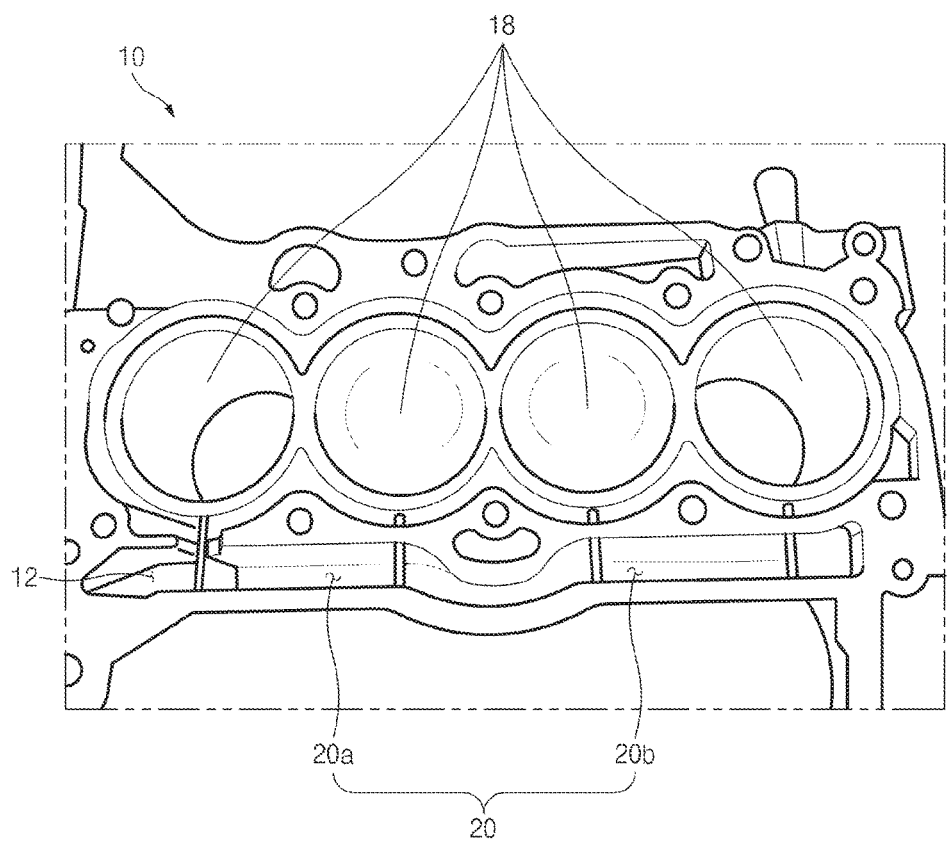
FIG. 3 is a view illustrating a cylinder block of an embodiment of the present disclosure.
Figure 4A:
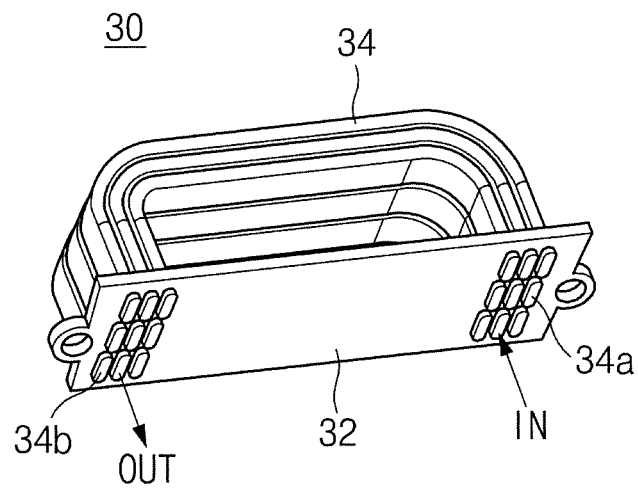
FIGS. 4A and 4B are perspective views illustrating 'A' and 'B' portions of FIG. 2.
Figure 4B:
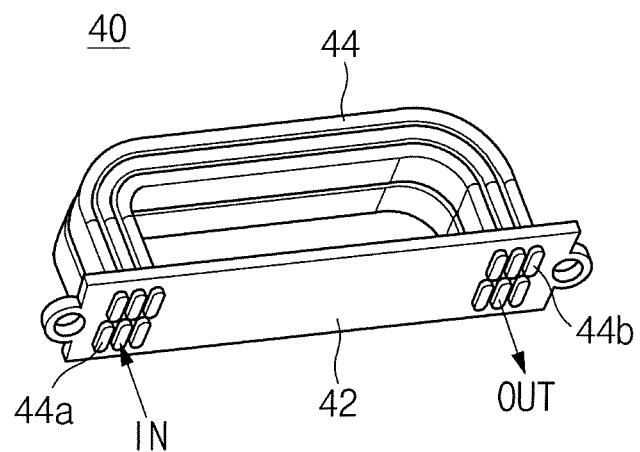

FIG. 1 is a perspective view illustrating a vehicle engine according to an embodiment of the present disclosure, FIG. 2 is a perspective view illustrating a cylinder block according to an embodiment of the present disclosure, FIG. 3 is a view illustrating a cylinder block of an embodiment of the present disclosure, FIGS. 4A and 4B are perspective views illustrating 'A' and 'B' portions of FIG. 2.

FIG. 1 is a perspective view illustrating a vehicle engine according to an embodiment of the present disclosure, and FIG. 2 is a perspective view illustrating a cylinder block according to an embodiment of the present disclosure.

Describing a vehicle engine according to an embodiment of the present disclosure with reference to FIGS. 1 to 4B, the vehicle engine may include a combustion chamber 18 having a reciprocating piston, a water jacket 16 formed to flow cooling water to cool the combustion chamber 18, and a cylinder block 1 forming a skeleton, or structure, of the engine, and the cylinder block 1 may be equipped with a cylinder block body 10 where the combustion chamber 18 is formed and a plurality of EGR coolers 30, 40 that exchange heat with the cooling water supplied to the cylinder block body 10.

The cylinder block body 10 may be provided with a plurality of cylinders 18 formed in series, or in another arrangement, in the direction of length of the cylinder block body 10. The cylinder block body 10 may include an EGR cooler insertion part 20 which may be formed in the longitudinal direction of the cylinder block body 10, and to which the cooling water may be introduced. The cylinder block 1 may be provided with a plurality of EGR coolers 30 so that an exhaust gas discharged from an internal combustion engine of the vehicle may exchange heat with a water jacket 16.

The cylinder block body 10 may be provided with the water jacket 16 which may be formed to cool the plurality of reciprocating elements in the cylinders 18 which move up and down 18. The cylinder block body 10 may be provided with an inlet 12 to which the cooling water is introduced. The cylinder block body 10 may be provided with a feed inlet 14 so as to supply the cooling water introduced via the inlet 12 into the water jacket 16, and the cooling water may be introduced into the plurality of EGR coolers 30.

The feed inlet 14 may be formed in the cylinder block body 10 to supply the cooling water introduced from the outside of the cylinder block body to the water jacket 16 from the inlet 12. At this time, the cooling water may flow toward a direction in which the plurality of EGR coolers 30 are inserted.

The inlet 12 to which the cooling water is introduced from the outside of the cylinder block body may be formed in the cylinder block body 10. The feed inlet 14 for guiding the cooling water from the inlet 12 to the water jacket 16 may be formed in the cylinder block body 10. The cylinder block body 10 may be formed in such a manner that the inlet 12 is close to the feed inlet 14.

The cylinder block body 10 may be branched so that the cooling water may move to the feed inlet 14 and the EGR cooler insertion part 20. In addition, since the cooling water may be directly introduced to the water jacket 16 and the EGR cooler insertion part 20, a cooling rate may be enhanced as the cooling water which did not exchange heat cools the plurality of cylinders 18 and the plurality of EGR coolers 30 and 40 respectively.

The water jacket 16 may be formed in the shape of an arc surrounding the outer periphery of the plurality of cylinders 18 which exchange heat. The cooling water may be introduced through the feed inlet 14 and circulated. The cooling water which may be introduced into the water jacket 16 and may exchange heat may thus be discharged and circulated.

The EGR cooler insertion part 20 may be lengthwise formed in the left and right directions along the longitudinal direction of the cylinder block body 10. The EGR cooler insertion part 20 may be provided with a first insertion part 20a and a second insertion part 20b to which the plurality of EGR coolers 30 and 40 are inserted from the outside of the cylinder block body 10. The EGR cooler insertion part 20 may be provided with a chamber 25 formed for guiding the cooling water in the direction of the EGR cooler insertion part 20.

A plurality of chambers 25 may be formed so that the plurality of EGR coolers 30 and 40 may be inserted therein. The chambers 25 may be provided with a first chamber 25a extending from the inlet 12 and the feed inlet 14 of the cylinder block body 10, and a second chamber 25b extending from the first chamber 25a.

The first chamber 25a may guide the cooling water introduced through the inlet 12 to the feed inlet 14 and a first EGR cooler 30. The plurality of EGR coolers 30 and 40 may be inserted to the first chamber 25a and the second chamber 25b. The first insertion part 20a may communicate with the first chamber 25a such that one of the plurality of EGR coolers is inserted to be disposed in the first chamber 25a. The second insertion part 20b may communicate with the second chamber 25b such that one of the plurality of EGR coolers is inserted to be disposed in the second chamber 25b.

The plurality of EGR coolers 30 and 40 may be inserted into the EGR cooler insertion part 20 and exchange heat with the cooling water at different heat exchange rates. In the plurality of EGR coolers 30 and 40, the EGR cooler having a large amount of heat exchange with the cooling water may be disposed close, or relatively close, to the inlet 12.

The plurality of EGR coolers 30 and 40 may include a first EGR cooler 30 inserted into one of the chambers and a second EGR cooler 40 inserted into one other of the chambers 25.

In detail, the first EGR cooler 30 may be inserted into and coupled to the EGR cooler insertion part 20. The first EGR cooler 30 may be provided with a first EGR cover 32 for closing the EGR cooler insertion part 20. The first EGR cooler 30 may be provided with a first gas tube 34 which may be installed in the first EGR cover 32. Here, when the first EGR cooler 30 is inserted into the first insertion part 20a, the cooling water may exchange heat with the first gas tube 34 and the first chamber 25a.

The first gas tube 34 may be provided with an intake port 34a to which the exhaust gas combusted in the engine may be introduced, and an exhaust-gas port 34b which may discharge the exhaust gas introduced through the intake port 34a. A plurality of first gas tubes 34 may be stacked in longitudinal and lateral directions. Here, it is illustrated that nine first gas tubes 34 are stacked in the longitudinal and lateral directions, but the number can be changed according to a rate of heat exchange and is not limited thereto.

In the first gas tube 34, the intake port 34a of the first gas tube 34 may be connected to an exhaust manifold (not shown) through the EGR cover 32. Further, in the first gas tube 34, the exhaust-gas port 34b of the first gas tube 34 may be connected to an intake manifold (not shown).

Accordingly, the first gas tube 34 may inhale the exhaust gas discharged from the exhaust manifold through the intake port 34a and discharge to the intake manifold through the exhaust-gas port 34b of the first gas tube 34. In this process, the exhaust gas inhaled to the first gas tube 34 may exchange heat with the cooling water to lower a temperature.

Meanwhile, the second EGR cooler 40 may be inserted into and coupled to the EGR cooler insertion part 20. The second EGR cooler 40 may be provided with a second EGR cover 42 for closing the EGR cooler insertion part 20. The second EGR cooler 40 may be provided with a second gas tube 44 which may be installed in the second EGR cover 42. Here, when the second EGR cooler 40 is inserted into the second insertion part 20b, the cooling water may exchange heat with the second gas tube 44 and the second chamber 25b.

A plurality of second gas tubes 44 is provided. The second gas tube, or each of the plurality of second gas tubes, 44 may be provided less than, or in a smaller number than, the first gas tube 34 and stacked in the longitudinal and lateral directions. The heat exchange amount of the cooling water with the second gas tube 44 may be implemented to be different, or different than that with the first gas tube 34. The second gas tube 44 may be provided with an intake port 44a to which the exhaust gas combusted in the engine may be introduced, and an exhaust-gas port 44b which may discharge the exhaust gas introduced through the intake port 44a.

It is illustrated that six second gas tubes 44 may be provided to be stacked in the longitudinal and lateral directions, but the number can be changed according to the heat exchange rate and is not limited thereto. However, the second gas tube 44 may be provided less than, or in a smaller number than, the first gas tube 34, and as the temperature of the cooling water which primarily cooled the first EGR cooler 30 becomes higher, the second gas tube 44 should be provided less than, or in a smaller number than, the first EGR cooler 30 to perform a cooling.

In the second gas tube 44, the intake port 44a of the second gas tube 44 may be connected to an exhaust manifold (not shown) through the EGR cover 42. Further, in the second gas tube 44, the exhaust-gas port 44b of the second gas tube 44 may be connected to an intake manifold (not shown).

Accordingly, the second gas tube 44 may inhale the exhaust gas discharged from the exhaust manifold through the intake port 44a and discharge to the intake manifold through the exhaust-gas port 44b of the second gas tube 44. In this process, the exhaust gas inhaled to the second gas tube 44 may exchange heat with the cooling water to lower a temperature.

The first EGR cooler 30 and the second EGR cooler 40 may be inserted into the first chamber 25a and the second chamber 25b respectively so that the intake port 44a of the second gas tube 44 may be disposed to be close to the intake port 34a of the first gas tube 34.

Accordingly, the first EGR cooler 30 and the second EGR cooler 40 may be provided with a different amount of intake exhaust gas.

The first gas tube 34 and the second gas tube 44 may be able to be formed into various shapes, and preferably may be formed into an elliptical shape, as in an embodiment of the present disclosure.

The operation of an apparatus for cooling a vehicle engine according to an embodiment of the present disclosure configured as described above is as follows.

FIG. 1 is a perspective view illustrating a vehicle engine according to an embodiment of the present disclosure, FIG. 2 is a perspective view illustrating a cylinder block of an embodiment of the present disclosure Describing an operation of a vehicle engine according to an embodiment of the present disclosure with reference to FIGS. 1 and 2, FIGS. 4A and 4B, since the cylinder block body 10 may be directly affected by a combustion gas heat of the high temperature during the start-up of the engine to reach a high-temperature, a high thermal conductivity and a high cooling effect are required. Thus, the cooling water may be circulated in the cylinder block body 10 in order to prevent burning, or damage to parts, by the heat of combustion.

The cooling water introduced into the cylinder block body 10 may be introduced into the water jacket 16 branched from the cylinder block body 10.

At this time, the cooling water introduced into the water jacket 16 may be supplied to the combustion chamber 18 having a reciprocating piston of the cylinder block body 10 to exchange heat with the piston, and may be supplied to the EGR cooler insertion part 20 formed in the outside of the cylinder block body 10, such that heat may be exchanged with the plurality of EGR coolers 30 and 40.

Between the cooling water supplied to the EGR cooler insertion part 20 and the plurality of EGR coolers 30 and 40 inserted in the EGR cooler insertion part 20, after exchanging heat with the exhaust gas by the cooling water, the exhaust gas may be discharged to the outside of the plurality of EGR coolers 30 and 40.

Here, the plurality of EGR coolers 30 and 40 may be provided with gas pipes 34 and 44 which may exchange heat with the cooling water respectively, and the gas pipes 34 and 44 may be provided in a different number, or in a different number from each other, such that the amount of heat exchange with the cooling water is changed.

Further, in the plurality of EGR coolers 30 and 40, the intake ports 34a and 44a receiving the exhaust gas combusted in the engine may be contiguous and may inhale the exhaust gas, and may exchange heat through the gas pipe 34 and 44 and the exhaust gas may be discharged through the exhaust-gas port 34b and 44b.

Since the EGR cooler 30 may be integrally formed with the cylinder block body 10, a space (layout) for mounting the EGR cooler may be reduced. As the EGR cooler 30 may be inserted into the EGR cooler insertion part 20, a vibration of the vehicle or a vibration generated in the surrounding parts such as the engine may be reduced, and assembly operations according to a joint (brazing) between parts may be reduced. In addition, a cooling efficiency may be improved as a cylinder head and the EGR cooler 30 may be cooled respectively.

The apparatus and the method for cooling a vehicle engine, according to embodiments of the present disclosure, may reduce vibrations of the vehicle or vibrations generated in the surrounding parts such as the engine.

Further, the apparatus and the method for cooling a vehicle engine according to embodiments of the present disclosure, may reduce a space (layout) for mounting the EGR cooler, and reduce the assembly operations needed according to a joint (brazing) between parts.

Further, the apparatus and the method for cooling a vehicle engine according to embodiments of the present disclosure, may improve a cooling efficiency as a cylinder head and the EGR cooler 30 are cooled respectively.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for cooling a vehicle engine, the apparatus comprising:
   a combustion chamber having a reciprocating piston;
   a water jacket for flowing cooling water to cool the combustion chamber; and
   a cylinder block forming a structure of the engine,
   wherein the cylinder block is equipped with a cylinder block body that includes the combustion chamber, and the cylinder block includes two or more EGR coolers that exchange heat with cooling water supplied to the cylinder block body,
   wherein the cylinder block body comprises:
      an EGR cooler insertion part formed as a cavity within the cylinder block body, wherein EGR cooler insertion part receives the two or more EGR coolers; and
      an inlet configured to guide the cooling water from an outside of the cylinder block body directly to the water jacket and the EGR cooler insertion part,
   wherein the two or more EGR coolers comprise:
      a first EGR cooler which is inserted into the EGR cooler insertion part to exchange heat between the cooling water and an exhaust gas and has a plurality of first gas tubes; and
      a second EGR cooler which is inserted into the EGR cooler insertion part to exchange heat between the cooling water and the exhaust gas and has a plurality of second gas tubes, and
   wherein the number of the plurality of second gas tubes is less than the number of the plurality of first gas tubes so that a heat exchange amount of the plurality of first gas tubes is larger than a heat exchange amount of the plurality of second gas tubes.

2. The apparatus of claim 1, wherein the EGR cooler insertion part is formed with one or more chambers into which the two or more EGR coolers are inserted.

3. The apparatus of claim 2,
   wherein the first EGR cooler comprises:
   a first EGR cover for closing the EGR cooler insertion part; and
   a first gas tube installed in the first EGR cover, and provided with an intake port to which an exhaust gas combusted in the engine is introduced and an exhaust-gas port which discharges the exhaust gas introduced through the intake port.

4. The apparatus of claim 3, wherein the second EGR cooler comprises:
   a second EGR cover for closing the EGR cooler insertion part; and
   a second gas tube installed in the second EGR cover and provided with an intake port to which an exhaust gas combusted in the engine is introduced and an exhaust-gas port which discharges the exhaust gas introduced through the intake port.

5. The apparatus of claim 4, wherein a plurality of first gas tubes are stacked in longitudinal and lateral directions, and a plurality of second gas tubes is stacked in the longitudinal and lateral directions.

6. The apparatus of claim 3, wherein the cylinder block body is provided with a feed inlet which induces the cooling water into the water jacket from the inlet, and wherein the cooling water flows to the feed inlet and the EGR cooler insertion part.

7. The apparatus of claim 3, wherein the one or more chambers comprises:
   a first chamber to which the first EGR cooler is inserted; and
   a second chamber to which the second EGR cooler is inserted, and
   wherein the first chamber communicates with the second chamber so that the cooling water which exchanged heat with the first EGR cooler is induced to the second chamber from the first chamber.

8. The apparatus of claim 7, wherein the cylinder block body includes a feed inlet which induces the cooling water into the water jacket from the inlet,
 wherein the first chamber distributes the cooling water introduced through the inlet to the feed inlet and the first EGR cooler.

9. The apparatus of claim 1, wherein the cylinder block body is branched such that the cooling water introduced via the inlet is directly supplied to the water jacket and the EGR cooler insertion part to individually cool the combustion chamber and the two or more EGR coolers.

* * * * *